(12) United States Patent
Chung (10) Patent No.: US 11,099,610 B1
(45) Date of Patent: Aug. 24, 2021

(54) MOBILE ELECTRONIC DEVICE (71) Applicant: GETAC TECHNOLOGY CORPORATION, Hsinchu County (TW)

(72) Inventor: Chia-Lung Chung, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/890,993

(22) Filed: Jun. 2, 2020

(51) Int. Cl.
*G06F 1/16* (2006.01)

(52) U.S. Cl.
CPC .......... *G06F 1/1656* (2013.01); *G06F 1/1684* (2013.01)

(58) Field of Classification Search
CPC .... G06F 1/1613; G06F 1/1626; G06F 1/1633; G06F 1/1656; G06F 1/169; G06F 1/184
See application file for complete search history.

(56) References Cited

U.S. PATENT DOCUMENTS

| | | | | |
|---|---|---|---|---|
| 5,697,718 A * | 12/1997 | Erler | ..................... | G06F 1/1616 361/679.09 |
| 6,104,809 A * | 8/2000 | Berson | ................. | G06K 7/0004 235/380 |
| 6,144,552 A * | 11/2000 | Whitcher | .......... | G02F 1/133308 248/917 |
| 7,239,728 B1 * | 7/2007 | Choi | ..................... | G06F 1/1601 382/116 |
| 7,379,569 B2 * | 5/2008 | Chikazawa | ........ | G06K 9/00013 382/124 |
| 2008/0092043 A1 * | 4/2008 | Trethewey | .............. | G06F 3/038 715/705 |
| 2008/0259551 A1 * | 10/2008 | Gavenda | ............... | G06F 1/1656 361/679.31 |
| 2009/0250515 A1 * | 10/2009 | Todd | ...................... | G06F 1/1656 235/383 |
| 2011/0133933 A1 * | 6/2011 | Davis | ................. | G08B 13/1436 340/571 |
| 2011/0164365 A1 * | 7/2011 | McClure | ............... | G06F 1/1698 361/679.3 |
| 2012/0099261 A1 * | 4/2012 | Reber | ..................... | G06F 1/182 361/679.3 |
| 2012/0170203 A1 * | 7/2012 | Oberpriller | ........... | G06F 1/1656 361/679.41 |
| 2012/0177358 A1 * | 7/2012 | Wittenberg | ........... | G06F 1/1656 396/448 |
| 2012/0307183 A1 * | 12/2012 | Schultz | ................. | G06F 1/1656 349/84 |
| 2012/0320554 A1 * | 12/2012 | Chiang | ................. | H01M 50/20 361/807 |
| 2013/0300265 A1 * | 11/2013 | Senatori | ............... | H05K 5/0017 312/7.2 |
| 2015/0049425 A1 * | 2/2015 | Gathings | ............... | G06F 1/1628 361/679.26 |

(Continued)

*Primary Examiner* — Anthony Q Edwards (57) ABSTRACT

The present invention provides a mobile electronic device including a metal framework, a back cover and a frame. A motherboard is provided on an inner side of the metal framework, and a periphery of the metal framework forms an installation wall provided with a first wire connection opening. The back cover is superimposed on the metal framework and covers one side of the metal framework. The frame includes a functional frame bar disposed at the installation wall.

14 Claims, 7 Drawing Sheets

(56) References Cited

U.S. PATENT DOCUMENTS

| | | | |
|---|---|---|---|
| 2016/0140381 A1* | 5/2016 | Weiner | G06K 9/00087 |
| | | | 382/124 |
| 2016/0187932 A1* | 6/2016 | Lin | G06F 1/1626 |
| | | | 361/679.09 |
| 2018/0240106 A1* | 8/2018 | Garrett | G06Q 20/40145 |

* cited by examiner

MOBILE ELECTRONIC DEVICE

BACKGROUND OF THE INVENTION

Field of the Invention

The present invention relates to a frame of a mobile electronic device and, more particularly, to a mobile electronic device including a frame having a replaceable functional frame bar.

Description of the Prior Art

Partial designs of outer forms of military standard mobile electronic devices cannot be easily altered due to structural strength considerations, and the overall structure of a housing needs to be re-designed if outer forms are to be altered, so as to meet structural strength requirements. Thus, it is extremely challenging to directly assemble an expansion module onto an original structure of a military standard mobile electronic device, under the premise that the structural strength requirements are met. Therefore, corresponding models need to be separately developed and designed for different utilization fields.

In view of the above, with respect to the drawback of the prior art, it is a development goal of the inventor of the present disclosure to solve and improve the above drawback with the aid of extensive search and the practice of theories.

SUMMARY OF THE INVENTION

The present invention provides a mobile electronic device having a replaceable functional frame bar.

The present invention provides a mobile electronic device including a metal framework, a back cover and a frame. A motherboard is provided on an inner side of the metal framework, and a periphery of the metal framework forms an installation wall provided with a first wire connection opening. The back cover is superimposed on the metal framework and covers one side of the metal framework. The frame includes a functional frame bar disposed at the installation wall.

In the mobile electronic device of the present invention, the frame includes at least one fixing frame bar, and the fixing frame bar and the functional frame bar are mutually connected and enclose the periphery of the metal framework. The metal framework appears rectangular in shape, and the frame is locked and connected with all corners of the metal framework.

The mobile electronic device of the present invention further includes a display panel which is superimposed on the metal framework and covers the other side of the metal framework opposite to the back cover.

In the mobile electronic device of the present invention, a protruding water-resistant rib extending along the installation wall is formed on the installation wall, an elastic structure is provided on the back cover, the elastic structure extends correspondingly to the water-resistant rib, and the water-resistant rib is embedded in the elastic structure. A plurality of function keys are provided on the periphery of the metal framework, the functional frame bar envelops the function keys, a plurality of keycaps corresponding to the function keys are provided on the functional frame bar, and the keycaps are individually exposed from the surface of the functional frame bar.

In the mobile electronic device of the present invention, the functional frame bar extends from at least one side of the metal framework to two adjacent sides. The functional frame bar is locked at a junction of the at least one side and the two adjacent sides.

In the mobile electronic device of the present invention, an expansion box is formed on the functional frame bar, a second wire connection opening in communication with the expansion box is formed in the functional frame bar, and the first wire connection opening corresponds in position to the second wire connection opening. The first wire connection opening butts against the second wire connection opening. A pair of opposite flanges configured at an interval are formed on the functional frame bar, the metal framework and the back cover are clamped between the flanges, and the second wire connection opening is located between the flanges.

The mobile electronic device of the present invention further includes at least one functional module provided in the expansion box, the functional module has an operation interface, the operation interface is exposed from a surface of the expansion box, and the functional module is connected to the motherboard by a wire through the first wire connection opening and the second wire connection opening. The functional module is plural in quantity, and the plurality of functional modules have different functions and are individually electrically connected to the wire. Each functional module is a fingerprint scanner, a barcode scanner, a magnetic stripe reader or a communication port.

In the mobile electronic device of the present invention, the frame includes a replaceable functional frame bar, and can thus be installed with corresponding functional modules according to different utilization requirements. From the aspect of design of the mobile electronic device of the present invention, only the design of the functional frame bar needs to be altered without making a significant change to the overall structure of the mobile electronic device. Therefore, the mobile electronic device of the present invention can be extensively and suitably used in various different utilization fields. The design of the mobile electronic device of the present invention can be readily modified in response to different purposes, and is thus capable of reducing design change cost and development time.

DETAILED DESCRIPTION OF THE EMBODIMENTS

Figure 1:
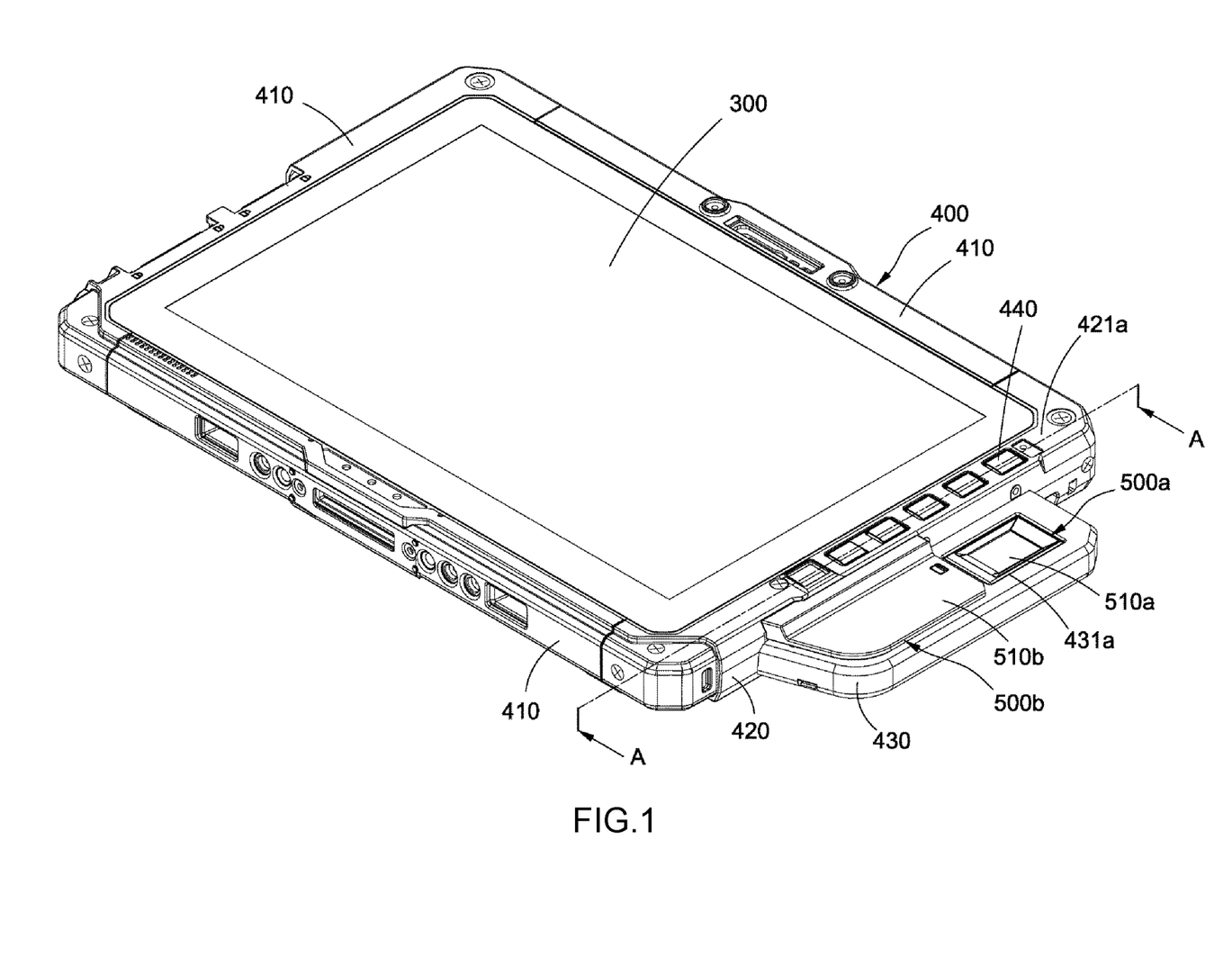
FIG. 1 is a three-dimensional schematic diagram of a mobile electronic device according to a preferred embodiment of the present invention.
Figure 2:
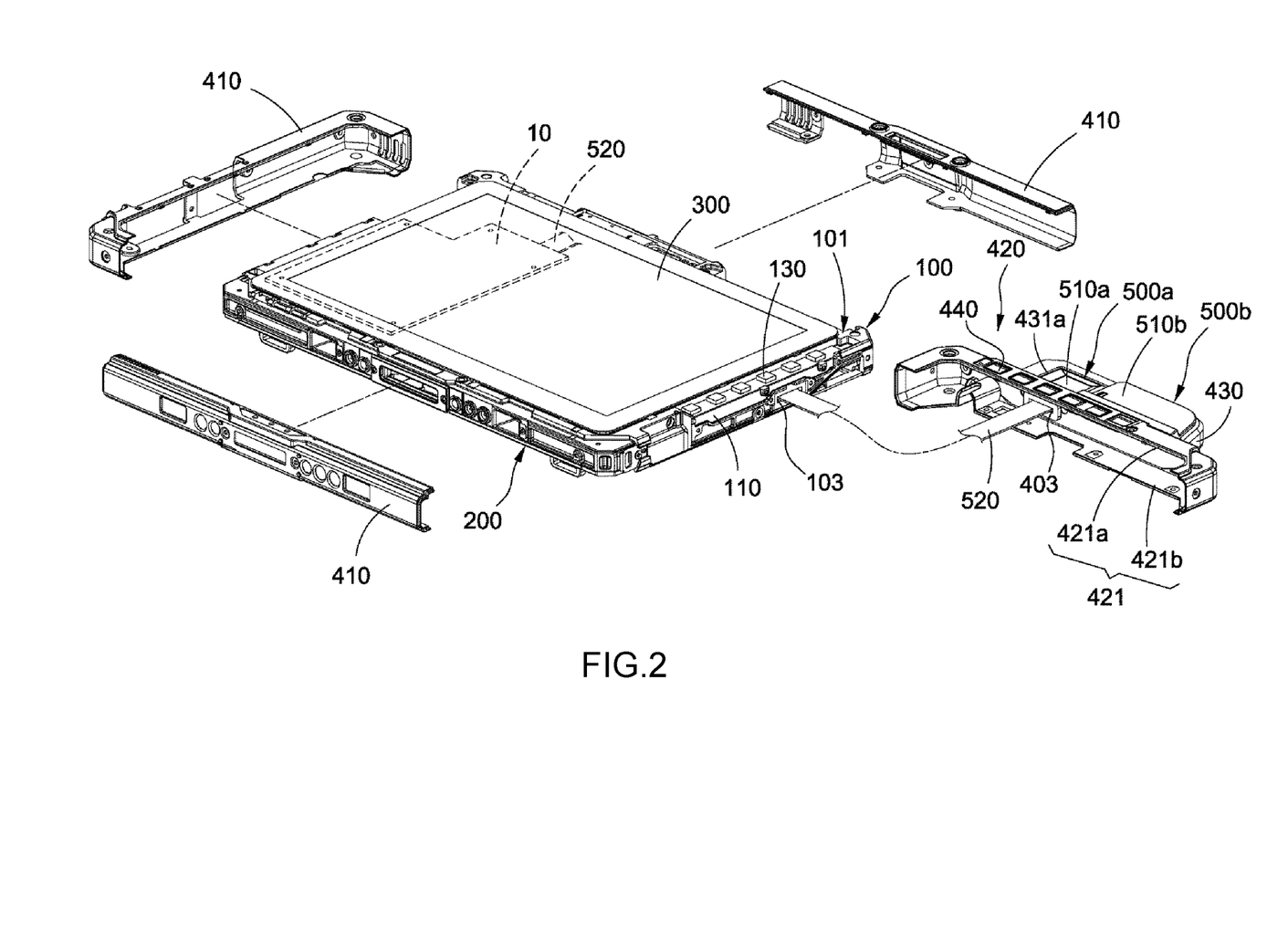
FIG. 2 is a three-dimensional exploded schematic diagram of a mobile electronic device according to a preferred embodiment of the present invention.
Figure 3:
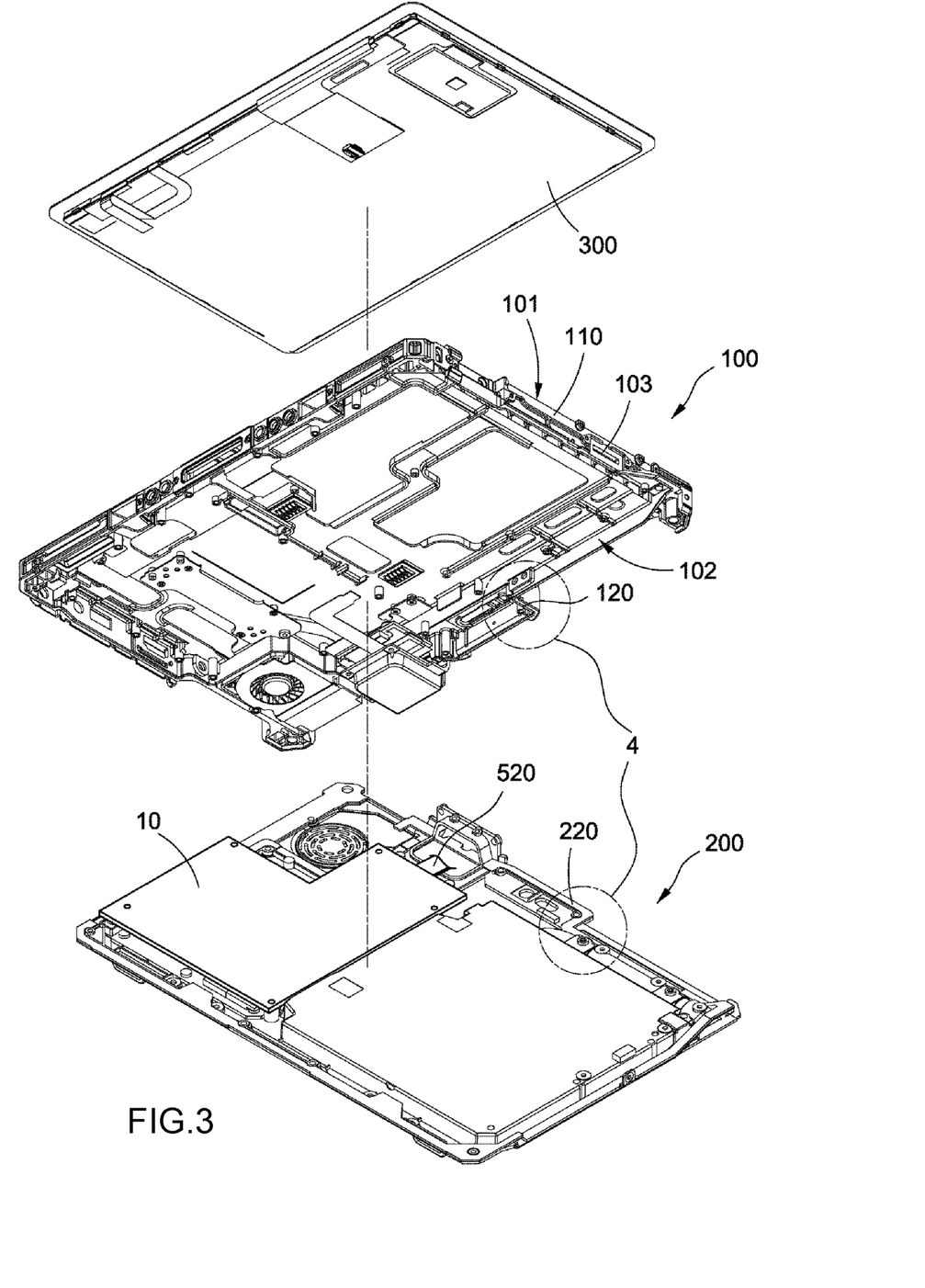
FIG. 3 is another three-dimensional exploded schematic diagram of a mobile electronic device according to a preferred embodiment of the present invention.

Referring to FIG. 1 to FIG. 3, a mobile electronic device provided according to a preferred embodiment of the present invention includes a metal framework 100, a back cover 200, a display panel 300, a frame 400 and at least one functional module 500.

In general, the metal framework 100 can be a flat body appearing substantially rectangular in shape. However, the metal framework 100 can also be configured as a flat body having different shapes according to different requirements. Two sides of the metal framework 100 are respectively a front surface 101 and a back surface 102. Furthermore, an installation wall 110 is formed at the metal framework 100. In this embodiment, the installation wall 110 is formed in a protruding manner on the back surface 102, and extends along a sealed curve so as to enclose a water-resistant space in the metal framework 100. Another space in communication with the exterior can be formed at the metal framework 100 and outside the installation wall 110, and a fan can be preferably placed therein. A motherboard 10 is provided on an inner side of the metal framework 100. In this embodiment, the motherboard 10 is superimposed on the back surface 102 of the metal framework 100, and is embedded within the range enclosed by the installation wall 110. At least one section of the installation wall 110 extends along the periphery of the metal framework 100, and a first wire connection opening 103 is provided at the section of the installation wall 110 where the periphery of the metal framework 100 is formed.

Figure 4:
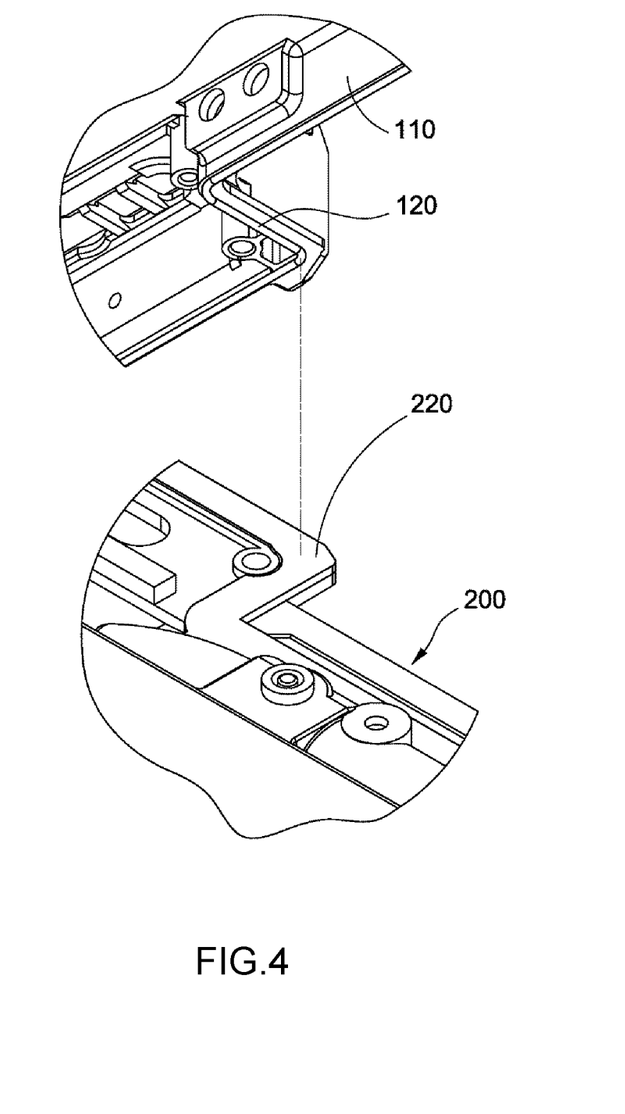
FIG. 4 is a partial enlarged diagram of FIG. 3.

Referring to FIG. 3 and FIG. 4, the back cover 200 is superimposed on the metal framework 100, covers the back surface 102 of the metal framework 100, and seals the range enclosed by the installation wall 110. In this embodiment, the back cover 200 is preferably made of plastic; however, the present invention is not limited to this example. A protruding water-resistant rib 120 extending along the installation wall 110 is formed on the installation wall 110, an elastic structure 220 is provided on the back cover 200, the elastic structure 200 extends correspondingly to the water-resistant rib 120, and the water-resistant rib 120 is embedded in the elastic structure 220 so as to hermetically seal the metal framework 100 by the back cover 200.

The display panel 300 is superimposed on the metal framework 100 and covers the front side 101 of the metal framework 100 opposite to the back cover 200. As such, the metal framework 100 is clamped between the back cover 200 and the display panel 300 and is closed. The display panel 300 is attached and fixed to the metal framework 100 preferably by means of adhering, such that an additional front cover for fixing the display panel 300 is not needed and the display panel 300 can be hermetically sealed accordingly with the metal framework 100.

Referring to FIG. 1 to FIG. 3, the frame 400 is preferably an annular frame corresponding in shape to the periphery of the metal framework 100, and surrounds the periphery of the metal framework 100. Furthermore, in this embodiment, the frame 400 preferably at least is locked and connected with all corners of the metal framework 100, so as to fix the frame 400 with the metal framework 100. In addition, at least the back cover 200 and the metal framework 100 can be clamped and fixed by the frame 400. However, the frame 400 can also further clamp the periphery of the display panel 300 so as to further fix the display panel 300 at the metal framework 100.

More specifically, the frame 400 is a structure assembled from and connected by multiple sections. The frame 400 includes at least one fixing frame bar 410 and a functional frame bar 420. The functional frame bar 420 is provided at the installation wall 110, and the functional frame bar 420 extends from at least one side of the metal framework 100 to two adjacent sides. The fixing frame bar 410 can be a single-section structure or a multi-section connected structure, the fixing frame bar 410 covers a part of the periphery of the metal framework 100 and is connected to the functional frame bar 420, and the frame 400 accordingly surrounds and defines the periphery of the metal framework 100. Specific structural details of the fixing frame bar 410 and the functional frame bar 420 are described below.

The fixing frame bar 410 appears as a long strip in shape, and can be a strip of multiple straight pieces connected to one another or be a single curved strip. In this embodiment, three fixing frame bars 410 connected to one another respectively correspond to three sides of the periphery of the rectangular metal framework 100 on which the first wire connection opening 103 is not provided. One side of the fixing frame bar 410 protrudes to form a pair of opposite flanges 421 configured at an interval. The pair of flanges 421 at least clamp the metal framework 100 and the back cover 200 therebetween. More specifically, the fixing frame bar 410 is locked and connected to the metal framework 100, and the pair of flanges 421 are respectively a front flange 421a and a back flange 421b, thereby pressing and fixing the back cover 200 on the metal framework 100 by the back flange 421b. The front flange 421a can press the metal framework 100 and can further press the periphery of the display panel 300 so as to press and fix the display panel 300 at the metal framework 100.

Figure 5:
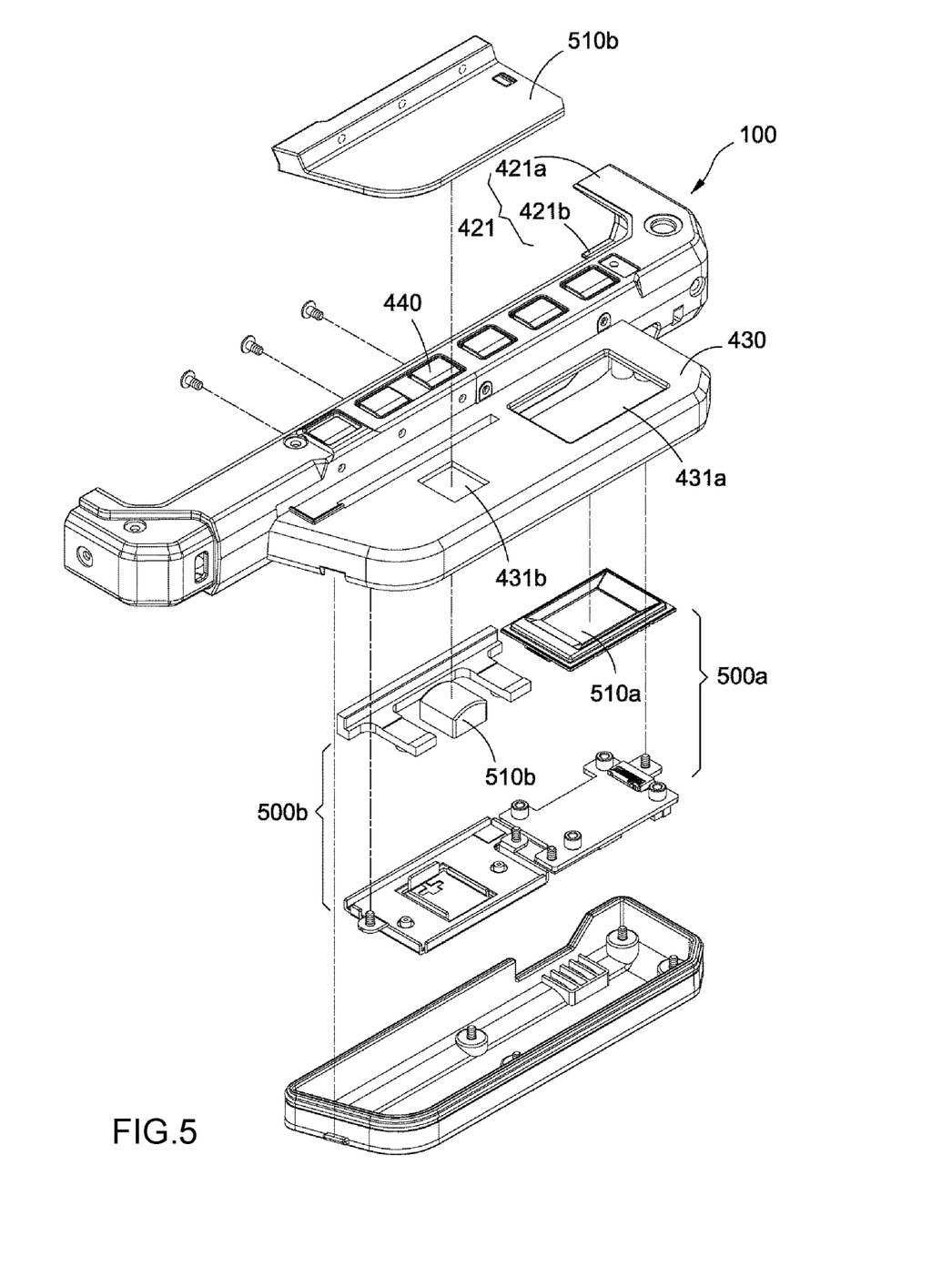
FIG. 5 is a three-dimensional exploded schematic diagram of a functional frame bar and a functional module in a mobile electronic device according to a preferred embodiment of the present invention.

Referring to FIG. 2 and FIG. 5, the functional frame bar 420 is configured on the side of the periphery of the metal framework 100 where the first wire connection opening 103 is located. The functional frame bar 420 appears as a long strip in shape, and one side of the functional frame bar 420 also protrudes to form a pair of the flanges 421 described above to accordingly clamp the metal framework 100 and the back cover 200 therebetween by using the same configuration. The fixing frame bar 410 is locked and connected to the metal framework 100. Furthermore, the functional frame bar 420 is locked at a junction of the position where the functional frame bar 420 is located on the metal framework 100 and the two adjacent sides of the metal framework 100. The pair of flanges 421 on the functional frame bar 420 are similarly respectively a front flange 421a and a back flange 421b, and the functional frame bar 420 presses and fixes the back cover 200 on the metal framework 100 by the back flange 421b. The front flange 421a of the functional frame bar 420 can press the metal framework 100, and can further press the periphery of the display panel 300 so as to press and fix the display panel 300 at the metal framework 100.

The difference between the functional frame bar 420 and the fixing frame bar 410 is that, an expansion box 430 is formed on the functional frame bar 420, a second wire connection opening 403 in communication with the expansion box 430 is formed in the functional frame bar 420, and the second wire connection opening 403 is located between the pair of flanges 421 of the functional frame bar 420 and is configured correspondingly in position to the first wire connection opening 103. More specifically, the first wire connection opening 103 and the second wire connection opening 403 can be opposite to each other but configured separately, so as to allow a wire 520 to pass through the first wire connection opening 103 and the second wire connection opening 403 from the metal framework 100 to enter the expansion box 430. However, in this embodiment, the first wire connection opening 103 preferably butts against the second wire connection opening 403, so as to allow the internal space of the expansion box 430 to be in communication with the internal space of the metal framework 100 in a hermetical sealing manner.

The functional modules 500a and 500b are provided in the expansion box 430, and have respective operation interfaces 510a and 510b which are exposed from the surface of the expansion box 430. More specifically, operation openings 431a and 431b respectively corresponding to the functional modules 500a and 500b are provided on the expansion box 430. The operation interfaces 510a and 510b are exposed from the surface of the expansion box 430 respectively through the corresponding operation openings 431a and 431b. The functional modules 500a and 500b are electrically connected to the wire 520, and the wire 520 is further electrically connected to the motherboard 10. Thus, the functional modules 500a and 500b can be electrically connected to the motherboard 10 by the wire 520 through the first wire connection opening 103 and the second wire connection opening 403.

In this embodiment, the functional modules 500a and 500b are preferably plural in quantity and have different functions. The functional modules 500a and 500b are individually electrically connected to the wire 520, and are electrically connected to the motherboard 10 by the wire 520 so as to expand various different add-on functions for an electronic device. However, the present invention is not limited to the example above, and the functional module can also be single in quantity, so as to expand one single add-on function for the electronic device. More specifically, the functional modules 500a and 500b illustrated in this embodiment are respectively a fingerprint scanner and a magnetic stripe reader. However, the present invention is not limited to these examples, and the functional modules 500a and 500b can also be barcode scanners.

Figure 6:
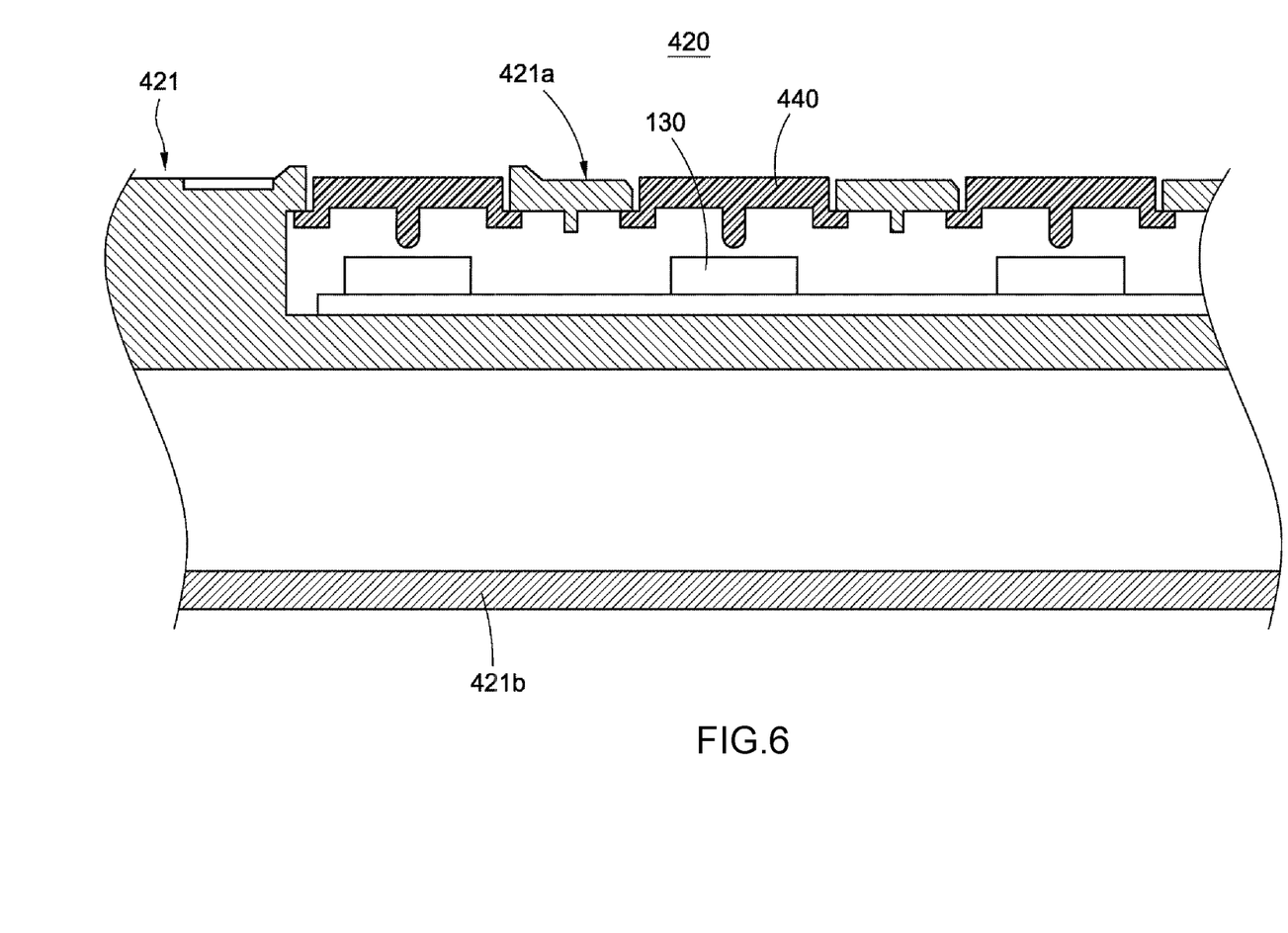
FIG. 6 is a cross-sectional diagram taken along line A-A in FIG. 1.

Referring to FIG. 2 and FIG. 6, a plurality of function keys 130 are provided on the periphery of the metal framework 100. The function keys 130 can be configured on one side of the metal framework 100, or can be configured on a peripheral side of the metal framework 100. The functional frame bar 420 envelops the function keys 130, a plurality of keycaps 440 respectively corresponding to the function keys 130 are provided on the functional frame bar 420, and the keycaps 440 are individually exposed from the surface of the functional frame bar 420. A plurality of function keys 130 are provided in the functional frame bar 420. In this embodiment, the keycaps 440 are preferably exposed from the front flange 421a of the functional frame bar 420. The front flange 421a of the functional frame bar 420 can be provided with openings for assembly of the keycaps 440, and the keycaps 440 can also be combined at the functional frame bar 420 by means of two-shot injection molding so as to facilitate an assembly process.

Figure 7:
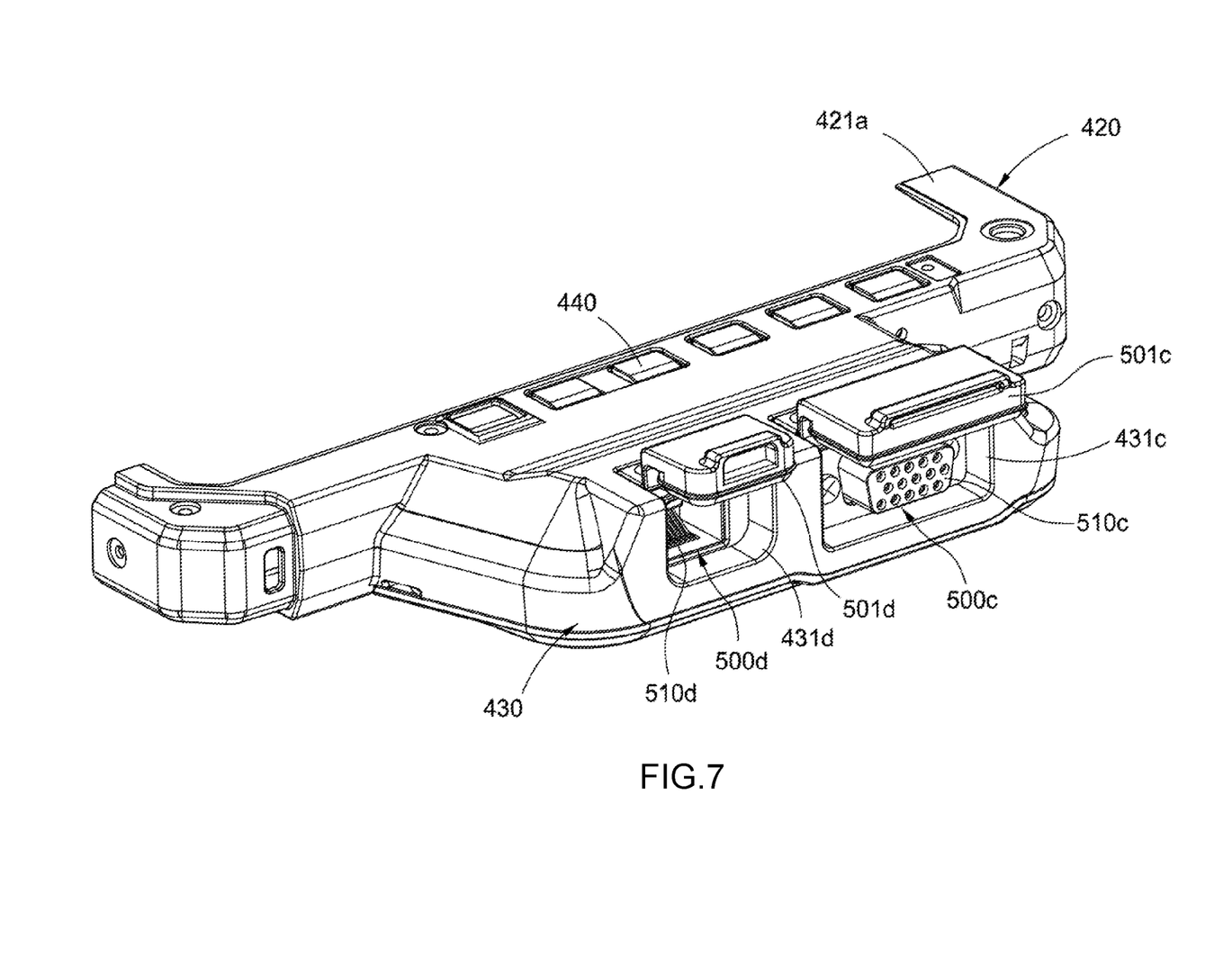
FIG. 7 is a schematic diagram of another implementation form of the functional frame bar in a mobile electronic device according to a preferred embodiment of the present invention.

Referring to FIG. 7 showing the functional frame bar 420 in another implementation form of this embodiment, two functional modules 500c and 500d in the expansion box 430 are respectively a network communication port and a video communication port, and the expansion box 430 is provided with operation openings 431c and 431d respectively corresponding to the functional modules 500c and 500d. Operation interfaces 510c and 510d of the network communication port are RJ45 jacks, and the operation interface 510c of the video communication port is a VGA jack. The operation interfaces 510c and 510d are respectively exposed from the corresponding operation openings 431c and 431d, and the operation openings 431c and 431d are respectively sealed by water-resistant covers 501c and 501d.

In the mobile electronic device of the present invention, the frame 400 includes the function frame bar 420 that can be replaced, and thus the corresponding functional modules 500a, 500b, 500c and 500d can be selected and installed according to different utilization requirements. The design of separately assembling the functional frame bar 420 and the fixing frame bar 410 allows the design of the functional frame bar 420 to change without affecting the structural strength at the fixing frame bar 410. For function expansion, only the design of the functional frame bar 420 needs to be altered without making a significant change to the overall structure of the mobile electronic device. Therefore, the mobile electronic device of the present invention can be extensively and suitably used in various different utilization fields. The design of the mobile electronic device of the present invention can be readily modified in response to different purposes, and is thus capable of reducing design change cost and development time.

The preferred embodiments of the present invention are described as examples and are not to be construed as limitations to the claims of the present invention. Other equivalent changes practicing the inventive spirit of the present invention are to be encompassed within the scope of the present invention.

What is claimed is:

1. A mobile electronic device, comprising:
   a metal framework, provided with a motherboard on an inner side thereof, a periphery of the metal framework forming an installation wall, the installation wall being provided with a first wire connection opening;
   a back cover, superimposed on the metal framework and covering one side of the metal framework; and
   a frame, comprising a functional frame bar, the functional frame bar being provided at the installation wall;
   wherein an expansion box is formed on the functional frame bar, a second wire connection opening in communication with the expansion box is formed in the functional frame bar, and the first wire connection opening corresponds in position to the second wire connection opening.

2. The mobile electronic device according to claim 1, wherein the frame comprises at least one fixing frame bar, and the fixing frame bar and the functional frame bar are mutually connected to enclose the periphery of the metal framework.

3. The mobile electronic device according to claim 1, wherein the metal framework is rectangular in shape, and the frame is locked and connected with all corners of the metal framework.

4. The mobile electronic device according to claim 1, further comprising:
   a display panel, superimposed on the metal framework, covering the other side of the metal framework opposite to the back cover.

5. The mobile electronic device according to claim 1, wherein a protruding water-resistant rib extending along the installation wall is formed on the installation wall, an elastic structure is provided on the back cover, the elastic structure extends correspondingly to the water-resistant rib, and the water-resistant rib is embedded in the elastic structure.

6. The mobile electronic device according to claim 1, wherein a plurality of function keys are provided on the periphery of the metal framework, the functional frame bar envelops the function keys, a plurality of keycaps corresponding to the function keys are provided on the functional frame bar, and the keycaps are individually exposed from a surface of the functional frame bar.

7. The mobile electronic device according to claim 1, wherein a plurality of function keys are provided in the functional frame bar, a plurality of keycaps corresponding to the function keys are provided on the functional frame bar, and the keycaps are individually exposed from a surface of the functional frame bar.

8. The mobile electronic device according to claim 1, wherein the functional frame bar extends from at least one side of the metal framework to two adjacent sides.

9. The mobile electronic device according to claim 8, wherein the functional frame bar is locked at a junction of the at least one side and the two adjacent sides.

10. The mobile electronic device according to claim 1, wherein the first wire connection opening butts against the second wire connection opening.

11. The mobile electronic device according to claim 1, wherein a pair of opposite flanges configured at an interval are formed on the functional frame bar, the metal framework and the back cover are clamped between the pair of flanges, and the second wire connection opening is located between the pair of flanges.

12. The mobile electronic device according to claim 1, further comprising:

at least one functional module, provided in the expansion box;

wherein, the functional module has an operation interface, the operation interface is exposed from a surface of the expansion box, and the functional module is connected to the motherboard by a wire through the first wire connection opening and the second wire connection opening.

13. The mobile electronic device according to claim 12, wherein the functional module is plural in quantity, and the plurality of functional modules have different functions and are individually electrically connected to the wire.

14. The mobile electronic device according to claim 12, wherein the functional module is a fingerprint scanner, a barcode scanner, a magnetic stripe reader or a communication port.

\* \* \* \* \*